April 17, 1962     O. A. KOTTEMANN     3,030,145
VENTILATING SEAT PAD
Filed Aug. 26, 1953                                                  2 Sheets-Sheet 2
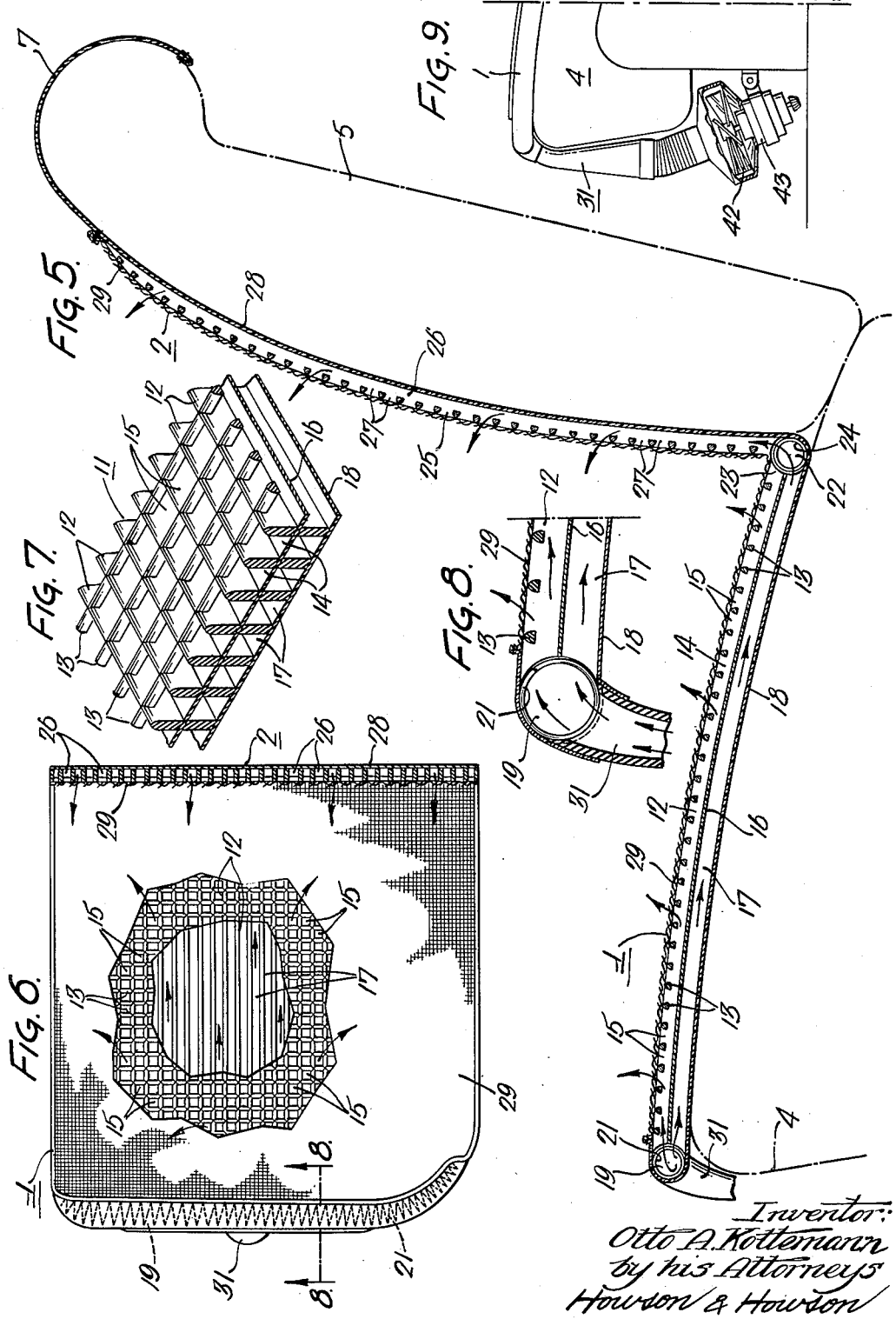
Inventor:
Otto A. Kottemann
by his Attorneys
Howson & Howson United States Patent Office 3,030,145
Patented Apr. 17, 1962

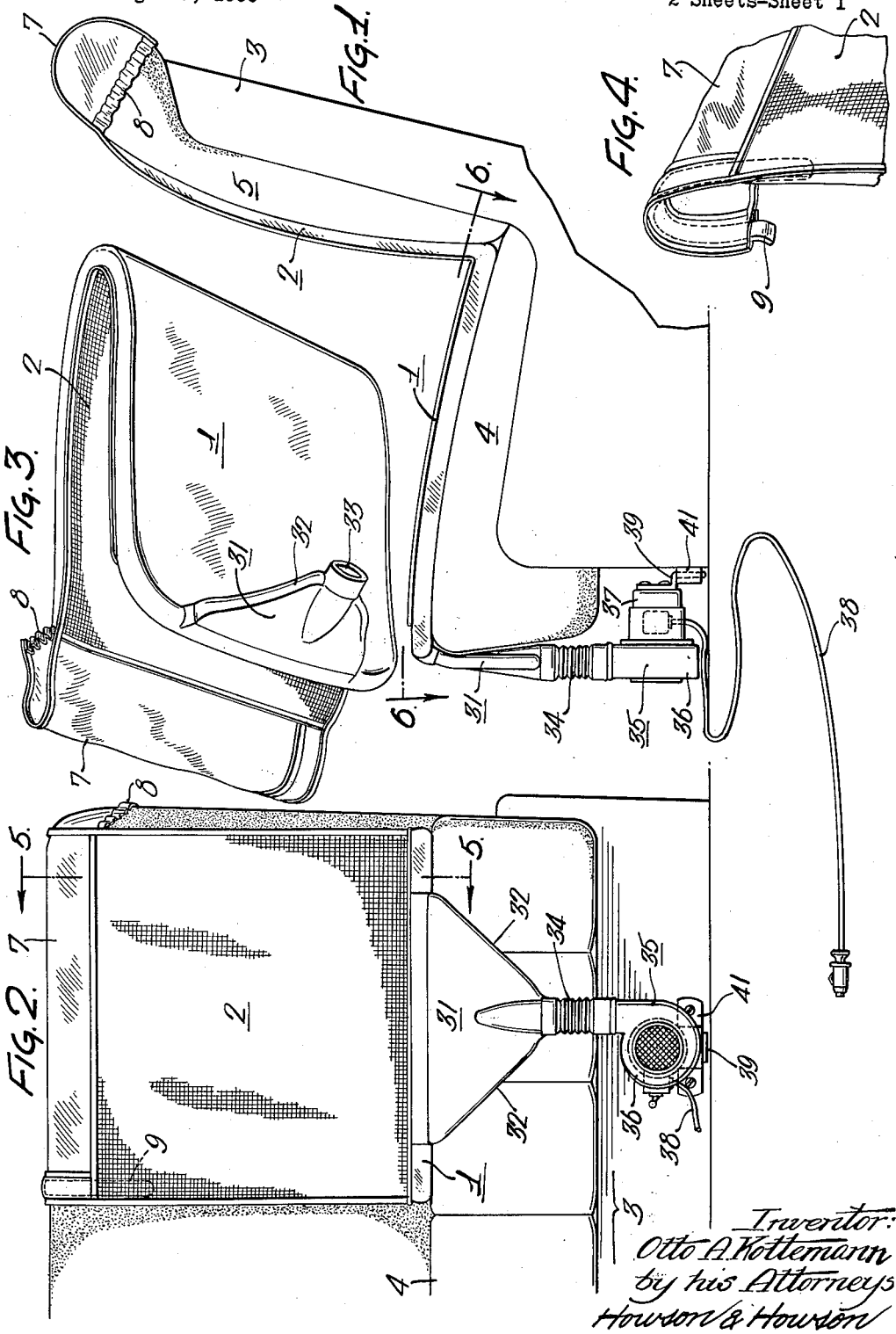

3,030,145
VENTILATING SEAT PAD
Otto A. Kottemann, Charlotte, N.C., assignor to Kushion Kooler Corporation, Charlotte, N.C., a corporation of North Carolina
Filed Aug. 26, 1953, Ser. No. 376,731
13 Claims. (Cl. 297—180)

A principal object of this invention is to provide a seat cover or pad primarily for the seats of automotive vehicles and other passenger carriers which will afford efficient ventilation for the surfaces of the body of an occupant of the seat, the device being suitable also for use with chairs generally in areas containing an available source of electrical energy. The device has an application of particular value to the seats of military tanks wherein the operating personnel are confined for long periods to their seats under highly adverse conditions.

Another object of the invention is to provide a ventilating seat cover of the stated character constituting a unitary portable article of manufacture including a means for circulating air through the cover.

More specifically, the invention comprises a unitary cover in the form of an air-permeable pad adjustable to the seat or back portions of the seat, or both, together with means for circulating air through the pad and over and in contact with the body of one seated thereon or resting thereagainst.

To this latter end, the invention contemplates the provision of a seat cover unit comprising a basic open grid structure together with a duct system communicating with the openings in said grid, and means for circulating air through said duct system.

The invention contemplates also the provision of a cover unit of compact form capable of being folded into small compass for stowage and adapted to be applied to the base and back of a seat for the purpose described.

The invention resides further in certain structural details hereinafter described and illustrated in the attached drawings wherein:

FIGURE 1 is a side elevational view of a conventional passenger vehicle seat equipped with a ventilating cover in accordance with the invention;

FIGURE 2 is a front elevational view of the seat and cover shown in FIGURE 1;

FIGURE 3 is a view in perspective of the cover folded, the air circulating mechanism which forms a part of the unit being detached;

FIGURE 4 is a fragmentary view in perspective showing a means for attaching the upper edge of the cover to the back of the seat to support the cover in operative position;

FIGURE 5 is a vertical sectional view on the line 5—5, FIGURE 2;

FIGURE 6 is a sectional view on the line 6—6, FIGURE 1, portions of the cover being broken away to disclose the inner construction;

FIGURE 7 is a fragmentary view in perspective of the basic grid structure of the cover;

FIGURE 8 is a sectional view on the line 8—8, FIGURE 6, and

FIG. 9 is a fragmentary sectional view showing a modification within the scope of the invention.

With reference to the drawings, a cover made in accordance with my invention may comprise integrally united sections 1 and 2 which are adapted respectively to occupy positions on the seat base and against the back of the seat respectively, as shown in FIGURE 1 wherein the seat is designated generally by the reference numeral 3, said seat comprising a base cushion 4 and a back cushion 5. As shown in FIGURES 1 and 3, the seat cover is pad-like in form having substantial thickness but not excessive for the purpose of a supplemental pad. The upper edge of the rear section 2 of this pad is provided with an extension strip 7 of suitable fabric or sheet material which in assembly overlies the upper edge of the back cushion 5 of the seat and which is provided at each side of the cover with an elastic band 8 to secure the extension 7 in place in obvious manner. Other means may be used for this purpose such as that illustrated in FIGURE 4 wherein the extension 7 is provided at each side with a plastic or other resilient hook 9 which clips over the upper edge of the seat in well-known manner.

The internal structure of the seat cover is well illustrated in FIGURES 5 to 8 inclusive. Section 1 of the cover comprises a basic grid structure of the form well illustrated in FIGURE 7. This structure comprises an open grid 11, the cross elements of which designated in FIGURE 7 by the reference numerals 12 and 13 respectively occupy a common plane and which, therefore, in effect are in intersecting relation. The elements 12, however, are of greater vertical height than the elements 13 so that the lower portions of the elements 12 may define channels 14 which extend in parallel relation from front to rear of the cover and which communicate with grid openings 15 which are formed between the upper portions of the elements 12 and the elements 13. The channels 14 are closed at their bottoms by a partition 16 which extends parallel to the plane of the grid 11 and the elements 12 are extended below the partition 16 to form a series of lower channels 17 which are closed at the bottom by a lower cover sheet 18 which preferably is impermeable to air as also is the partition 16. The elements 12 and the partition 16 and cover sheet 18 thereby form a duct system comprising upper and lower separate sections, the channels or ducts 14 of the upper section communicating as previously described with the grid openings 15 and the ducts 17 in the lower section being separate from said grid.

With reference to FIGURE 5, the forward edge of the section 1 of the pad is provided with a manifold duct or chamber 19 which extends over the full transverse dimension of the cover and which communicates with both ducts 14 and 17. In the present instance, I have provided this manifold chamber with a wall supporting member in the form of a coiled spring 21 which functions to prevent crushing of the walls of the chamber and resulting interference with the function of this manifold.

With further reference to FIGURE 5, a corresponding manifold chamber is provided at the rear of the section 1, or at the juncture between that section and the section 2 of the cover, this manifold chamber being designated by the reference numeral 22. In the present instance, the chamber 22 communicates only with the ducts 17, the wall 23 of this chamber constituting the rear end wall of the ducts 14. The chamber 22, however, may if desired communicate also with thce ducts 14. A coiled spring 24 of the character of the spring 21 described above may be provided in the chamber 22 to aid in supporting the walls of the latter.

The section 2 of the cover comprises a basic grid structure of the character shown in FIGURE 7 with the exception that it lacks the lower duct structure and terminates in effect in the partition 16. The section 2, therefore, comprises the typical grid 25 corresponding to the grid 11 and the longitudinal ducts or channels 26 which correspond to the channels 14 and which communicate with the openings 27 in the grid 25. The rear wall of the channels 26 is formed in this instance by a rear cover sheet 28 which like the partion 16 of the section 1 is impermeable to air. As shown in FIGURE 5, the manifold chamber 22 communicates with the ducts or channels 26 of the section 2.

The grid 11 of the section 1 and the grid 25 of the section 2 are both covered by a suitable cover sheet 29 which is air-permeable and which preferably takes the form of a textile fabric of the characteristics hereinafter described. The basic grid structure described above corresponds with that disclosed and claimed in my co-pending application, Serial Number 376,286, filed August 25, 1953, now Patent No. 2,807,809.

The forward edge of the section 1 of the cover has a depending hollow extension 31, the form of which is well illustrated in FIGURE 3, this hollow extension communicating directly with the manifold chamber 19. The side walls 32 of the extension 31 converge downwardly as shown in FIGURE 2 and at their juncture point the extension has a port or opening 33 which is adapted for connection with or attachment to one end of a flexible hose 34. The lower end of the hose section 34 is connected to a motor-blower unit designated generally by the reference numeral 35, the blower element being indicated by the reference numeral 36 and the electrical motor by the reference numeral 37. An electrical cable 38 extending from the motor 37 provides for connection of the motor by way, for example, of the lighter socket on the dashboard of the motor vehicle with a suitable source of electric energy. In the present instance, the rear end of the motor housing is provided with a depending bracket 39 which cooperates with a suitable clip 41 at the bottom of the seat structure 3 to anchor the blower motor unit in place below the forward edge of the seat.

The aforedescribed construction provides for forced circulation of air by way of the blower 35 through the air-permeable cover by forcing the air into the cover through the manifold 19. It may be desirable under some conditions to obtain a forced circulation in reverse by evacuation of this manifold, and to this end, the blower-motor unit may be replaced by a fan 42 and reversible motor unit 43, as shown in FIG. 9.

Air forced into the manifold 19 will be divided between the ducts 14 and 17, the air entering the ducts 14 tending to discharge through the grid openings 15 and the air in the ducts 17 flowing to the manifold 22 from whence it is distributed to the ducts 26 and the grid openings 27 of the section 2 of the cover. In both cases, the top cover 29 acts to control the passage of air outwardly from the grid openings and thereby tends to create a degree of pressure in the ducts below the grid which effects a desirable relatively uniform distribution of air to the grid openings. The fabric cover 29 performs a further function of disseminating air laterally through the interstices of this cover over the exposed surface of the cover and between the grid and any object super-imposed on the cover. Thus any surface of the human body resting upon or against the surface of either of the sections 1 or 2 of the seat cover will in effect be insulated from the seat cushion by a film of air passing over the said body surfaces and acting to evaporate moisture and to prevent discomfort due to accumulated perspiration.

In accordance with the invention, the cover described above is sufficiently flexible to conform readily to the contours of the seat to which it may be applied and to the contours of the human body. To this end, the grid may be made of flexible rubber having a degree of resiliency, but of sufficient resistance to deformation to insure that the grid structure will be self-sustaining under the pressure of the body so as to preserve the duct system intact for free passage of air. The manifold 22 with its reinforcing spring 24 functions also as a hinge or natural line of flexure upon which the sections 1 and 2 may be folded together (see FIGURE 3) so that the device constitutes a compact and highly portable unit which may be used or stowed away as desired. In effect, the cover constitutes an air-permeable pad with means for circulating air through the pad to produce a film of moving air between the seat and the body in contact with the latter which provides the necessary ventilation for comfort. It is preferred to set up such circulation by evacuation of the manifolds 19 and 22, in that in this manner, the normal flow of the air over the body surface and into the cover tends to draw away the body moisture to produce a desirable cooling effect and to prevent the moisture accumulations which in warm weather render automobile and other vehicle travel uncomfortable.

I claim:

1. In a ventilated seat or other body-supporting structure, a flexible cellular organization forming the body-supporting surface portion of said structure and comprising elements defining a system of channels co-extensive with said surface portion and open to said surface, the channel-defining elements being constructed and arranged to afford access for direct flow of air to and from the channels over the entire area of said surface, the openings from the channels to the surface having at the latter a collective area materially greater than the collective area of the spaces between said openings at said surface, cover means for the said openings of said channels, said cover means being permeable to air over the entire areas of said openings, and means connected to said channels for creating a static pressure behind said cover means and throughout the said system differing from the atmospheric pressure on the other side of said cover means.

2. A ventilated structure according to claim 1 wherein the channel-defining elements taper so that they appear as lines at the said surface whereby the said elements offer no material obstruction to flow of air either into or from the channels in any part of the area of said surface.

3. A ventilated structure according to claim 2 wherein the cover means takes the form of a textile fabric.

4. A ventilated structure according to claim 1 comprising relatively spaced elements extending transversely to the channel-defining elements to form with the latter a flexible grid constiuting the body-supporting surface portion of the structure.

5. A ventilated structure according to claim 4 wherein both the channel-defining elements and the transverse elements are tapered toward the said surface so as to appear at said surface as lines whereby the entire area of said surface is unobstructed by said elements so as to afford the said access for direct flow of air to and from the channels over the entire area of said surface.

6. A portable ventilated seat pad unit comprising a flexible cellular organization shaped generally to the form of said seat and providing a body-supporting surface, said organization comprising elements defining a system of parallel channels extending over one dimension of the unit and co-extensive with said surface and opening to the latter, said channels being otherwise closed, the channel defining elements being constructed and arranged to afford access for direct flow of air to and from the channels over the entire area of said surface, cover means at said surface for the channels permeable to air over the entire area of said surface, and an air impeller device attached at one edge of the unit for creating a static pressure in said channels behind said cover means and throughout the said system differing from the atmospheric pressure on the other side of said cover means, the proximate ends of the channels being connected with each other and with the impeller by way of a manifold chamber extending at the edge of said pad unit, and the wall of said manifold chamber being supported by an open coil spring built into the structure of said pad.

7. A portable ventilated seat pad unit comprising a flexible cellular organization shaped generally to the form of a seat and providing a body-supporting surface, said organization comprising elements defining a system of parallel channels extending over one dimension of the unit and co-extensive with said surface and opening to the latter, said channels being otherwise closed, the channel defining elements being constructed and arranged to afford access for direct flow of air to and from the channels over the entire area of said surface, cover means at said surface for the channels permeable to air over the entire area of said surface, and an air impeller device attached at one edge of the unit for creating a static pressure in said channels behind said cover means and throughout the said system differing from the atmospheric pressure on the other side of said cover means, air-chamber means underlying the channels and connected to said impeller means, and additional ventilating means attached to said chamber means.

8. A ventilated pad unit according to claim 7 wherein the additional ventilating means comprises a second flexible cellular organization with a channel system and an air permeable cover means for said system, and means for flexibly joining the two systems at the proximate ends thereof to permit angular adjustments thereof about the line of juncture with respect to each other.

9. A self-contained and portable ventilated seat pad comprising in combination an open grid of flexible material forming the body-supporting surface, the opening-defining elements of said grid appearing at said surface as narrow lines so as to permit flow of air to and from the openings over the entire area of said surface, cover means of mesh formation for said grid, said cover means being air permeable over the entire area of the individual grid opening, and means in mutually supporting relation with said grid and cover for maintaining a static air pressure throughout the grid behind the cover means.

10. A ventilated seat according to claim 1 including means affording a plenum chamber connected with the said pressure means and with all of said channels.

11. A seat unit according to claim 9 wherein the pad comprises two grid sections together with means for flexibly joining said sections at proximate edges for relatively angular adjustability about the juncture, and wherein further the air pressure means comprises a separate duct system for each grid section, each of said systems having individual ducts and each duct being common to a plurality of grid openings, together with common air impeller means connected to both systems.

12. A ventilated structure according to claim 1 including means for uniting the cellular organization, the cover means, and the pressure creating means in mutually supporting relation to form a self-contained portable independent seat unit transferable as such from one position to another.

13. A ventilated structure according to claim 12 wherein the said pressure means consists of an air impeller and motor means for driving said impeller.

References Cited in the file of this patent

UNITED STATES PATENTS

| | | |
|---|---|---|
| 1,356,493 | Kerr | Oct. 19, 1920 |
| 1,475,912 | Williams | Nov. 27, 1923 |
| 1,777,982 | Popp | Oct. 7, 1930 |
| 2,012,042 | Gerlofson | Aug. 20, 1935 |
| 2,022,959 | Gordon | Dec. 3, 1935 |
| 2,059,226 | Gates | Nov. 3, 1936 |
| 2,158,801 | Petterson | May 16, 1939 |
| 2,204,449 | Gordon | June 11, 1940 |
| 2,461,432 | Mitchell | Feb. 8, 1949 |
| 2,493,067 | Goldsmith | Jan. 3, 1950 |
| 2,493,303 | McCullough | Jan. 3, 1950 |
| 2,512,559 | Williams | June 20, 1950 |
| 2,528,412 | Bickler | Oct. 31, 1950 |
| 2,758,532 | Awe | Aug. 14, 1956 |

FOREIGN PATENTS

| | | |
|---|---|---|
| 429,326 | France | July 13, 1911 |
| 359,829 | Italy | June 7, 1938 |
| 594,326 | Great Britain | Nov. 7, 1947 |